Dec. 17, 1946.   J. K. NORTHROP ET AL   2,412,646
TAILLESS AIRCRAFT
Filed Aug. 1, 1944   6 Sheets-Sheet 2

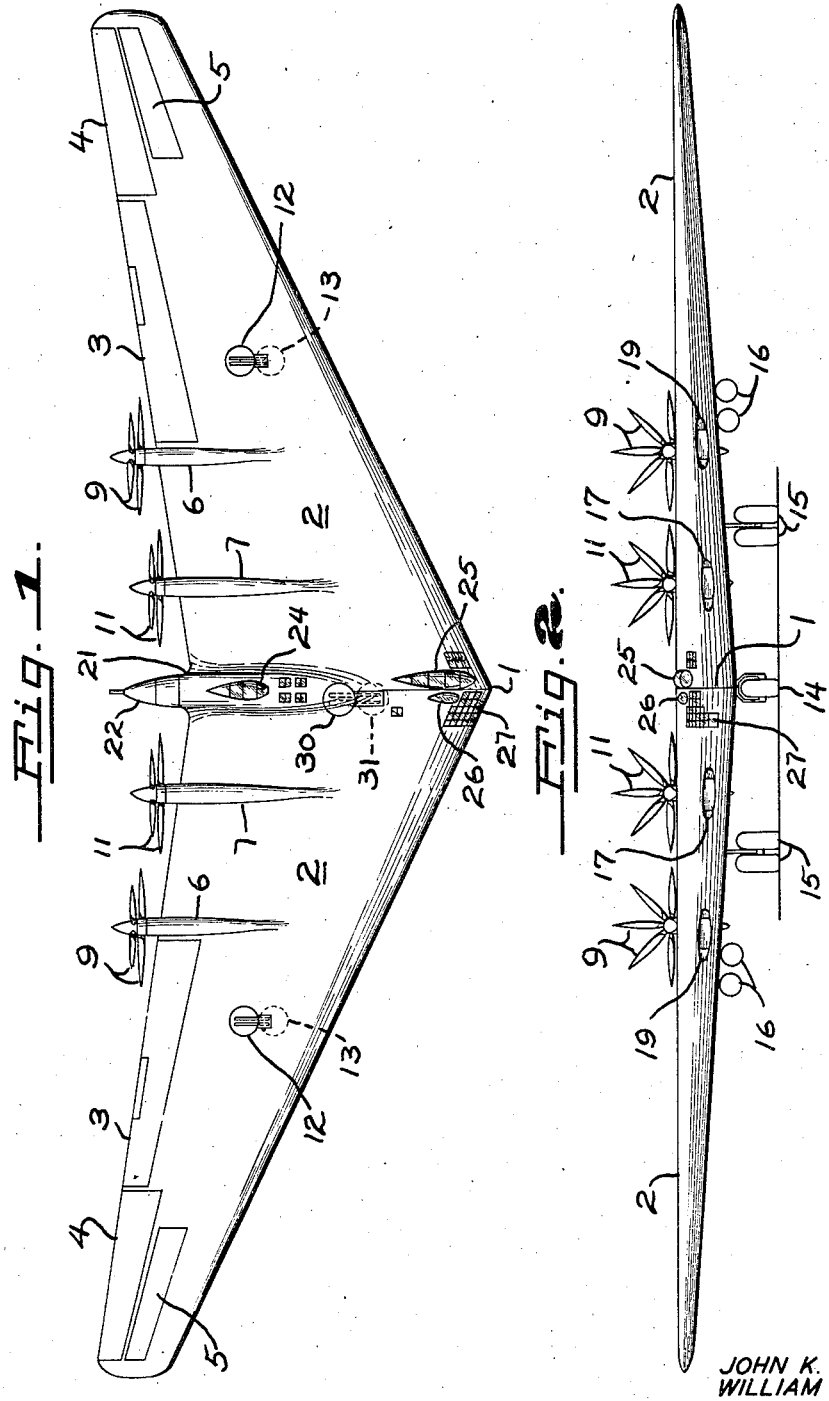

INVENTORS,
JOHN K. NORTHROP.
WILLIAM R. SEARS.
BY
Lippincott + Metcalf
ATTORNEYS.

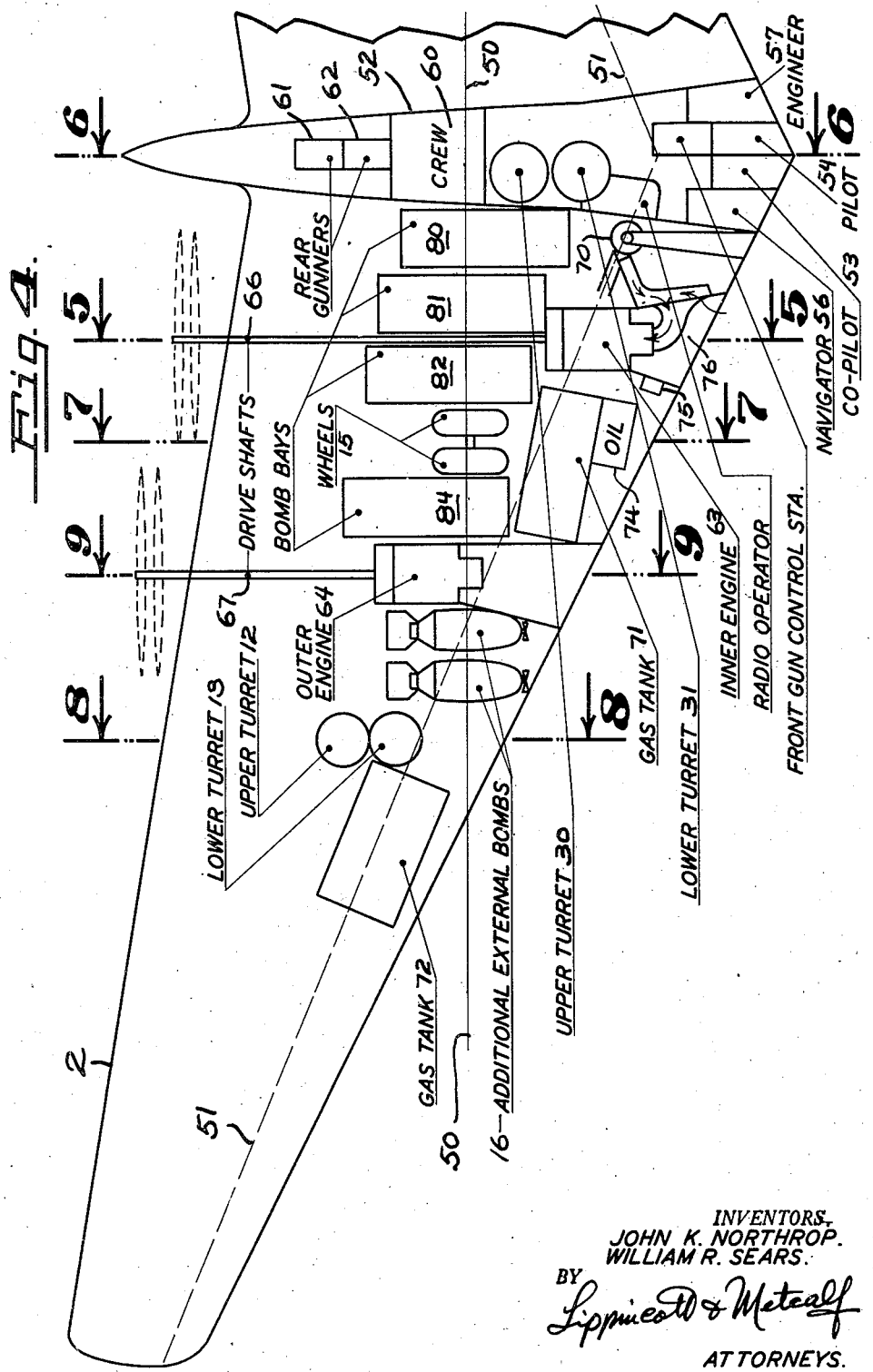

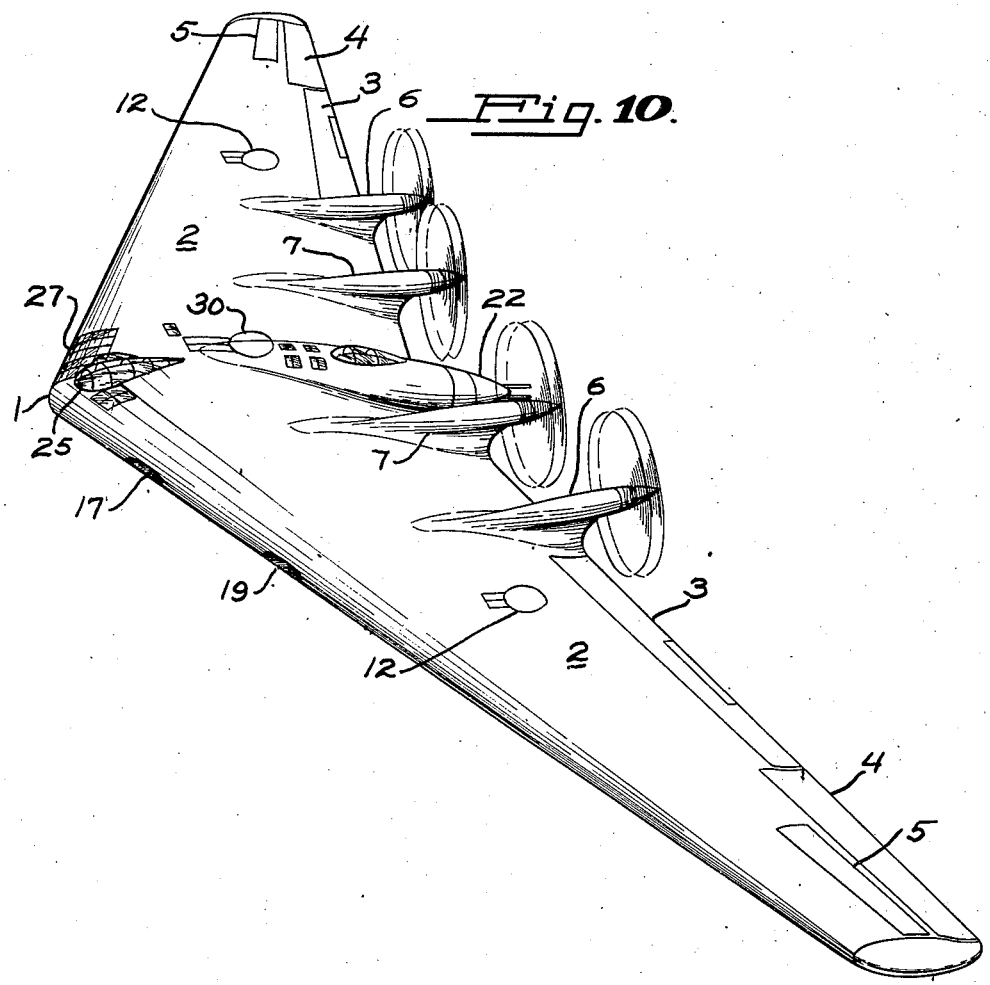

INVENTORS
JOHN K. NORTHROP
WILLIAM R. SEARS
BY
Lippincott + Metcalf
ATTORNEYS

Dec. 17, 1946.  J. K. NORTHROP ET AL  2,412,646
TAILLESS AIRCRAFT
Filed Aug. 1, 1944  6 Sheets-Sheet 6
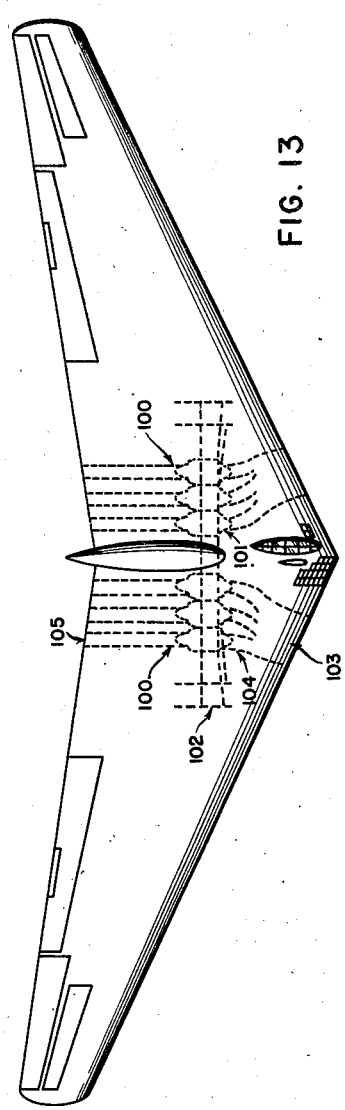
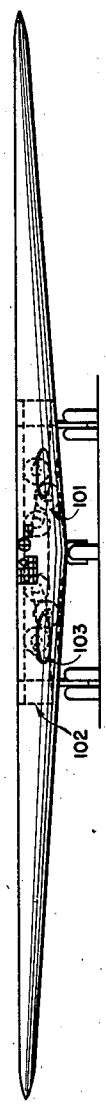
INVENTORS
JOHN K. NORTHROP
WILLIAM R. SEARS
BY Lippincott + Metcalf
ATTORNEYS.

Patented Dec. 17, 1946

2,412,646

UNITED STATES PATENT OFFICE 2,412,646

TAILLESS AIRCRAFT

John K. Northrop, Los Angeles, and William R. Sears, Inglewood, Calif., assignors to Northrop Aircraft, Inc., Hawthorne, Calif., a corporation of California Application August 1, 1944, Serial No. 547,594
In Canada December 15, 1943

21 Claims. (Cl. 244—13)

This invention relates to aircraft, and particularly to aircraft of the "all-wing," tailless type. The present application is a continuation-in-part of our original application entitled "Airplane," filed February 23, 1942, Ser. No. 432,016.

The broad purpose of the invention is to provide an airplane having superior flying qualities and to this end the objects of the invention are: To provide an improved tailless airplane having a habitable wing, wherein not only the crew and payload, but also all of the essential mechanism with the exception of the actual propellers may be housed; to provide a tailless airplane in which loss of lift by reason of upward elevator deflection in landing is reduced to negligible proportions; to provide an airplane of the character described, controllable to the same or even greater degree than is the conventional type; to provide an airplane having structural simplicity and great structural efficiency, and therefore of extreme lightness with respect to its carrying capacity, giving a large payload for a given gross weight and power; to provide an airplane having a comparatively small radius of gyration about its transverse axis, so that it may be stabilized and controlled by the application of relatively small moments; to provide an airplane wherein parasitic drag is reduced to a minimum, so as to give relatively high speed for a given size and power; to provide an airplane which may be flown at relatively large angles of attack without separation of the airstream, or stalling; to provide an airplane wherein the high lift or antistalling flows are supplied with maximum efficiency and without sacrifice of other advantages; to provide an airplane capable of carrying large disposable loads without excessive size, and to provide an airplane in which heavily loaded surfaces located at a distance from the wing may be completely eliminated, thus reducing the danger of vibration and flutter.

Other objects of our invention will be apparent or will be specifically pointed out in the description forming a part of this specification, but we do not limit ourselves to the embodiment of the invention herein described, as various forms may be adopted within the scope of the claims.

The idea of the all-wing or habitable-wing airplane is not new, but has occupied the attention of aeronautical engineers for nearly thirty years, since the early United States Patent No. 1,114,364 to Junkers, filed January 26, 1911, and dated October 20, 1914. The theoretical advantages of such a construction are generally recognized.

The entire structure can be utilized to supply lift, and since there is no fuselage (which contributes little or nothing to lift, but which does add to the weight), the saving in weight can be devoted to payload. The eliminated structures contribute in a large degree to drag, not only the drag due directly to their aerodynamic forms, but also an additional drag due to interference between the airflows caused by them and by the sustaining airfoils themselves. A reduction in parasitic drag, i. e., drag which contributes nothing to the lift, assures either that increased speed may be obtained from the same power, or that the same speed may be attained with less power.

The above-mentioned theoretical advantages of the all-wing airplane have been recognized for years, and many designers have endeavored to present a satisfactory solution to the problems involved. However, several unforeseen difficulties have heretofore prevented the development of the all-wing type, not the least of which has been the question of size. Gasparri, writing in 1932, published designs of a habitable plane with tail surfaces mounted on booms, with the statement that the minimum span at which such planes would become practical would be about 45 meters, or 148 feet, while the estimates of Junkers and other designers have greatly exceeded this figure. Obviously, if limited to such comparatively large spans, the usefulness of the all-wing type of plane would be theoretical rather than practical. As will be shown later, the airplane of our invention is practical with spans of as little as 35 or 40 feet.

Although no serious attempt has been made until now to produce an all-wing plane, some designers, such as Lippisch, Hill, Lachmann, Flauvel and others have constructed partially successful tailless airplanes. However, they have adhered to the use of a fuselage to house power plant, personnel and cargo, and to the use of vertical end plates near the wing tips in order to provide surfaces which would function in lieu of the conventional tail. Such expedients are only a partial solution, however, since the parasitic resistance of the conventional fuselage and tail, although possibly somewhat reduced, is not eliminated, and the structural efficiency is considerably impaired by the more complicated structure required.

Even more serious, however, is the question of stability. In order that flight characteristics might be considered satisfactory, it has heretofore been believed that an airplane must be highly statically stable about its three principal axes of pitch, yaw and roll; i. e., if its attitude of normal flight be disturbed with respect to any of these axes, substantial moments should thereby be set up which would tend to return it to normal attitude. Even after satisfactory stability had apparently been obtained by the use of end plates and other devices, some designers were unable to make their airplanes acceptably controllable.

The previously conceived requirement of great static stability mentioned above is in direct contrast to the characteristics of a conventional wing alone. However, as will be shown below, the requirement of great static stability is not a necessary prerequisite to the design of a successful tailless airplane, but has been carried over from the design of conventional airplanes by previous inventors, to the detriment of successful progress in the art. In order to clarify the difference between stability problems of conventional and tailless airplanes, we give a detailed description of applicable stabilizing processes in the following paragraphs.

Stability about the pitch axis is attained in conventional airplanes by horizontal tail surfaces which are usually set at a smaller aerodynamic angle of attack than the wing. These tail surfaces act through the long lever arm of the fuselage to hold the wing at the proper angle of attack. If the plane tends to nose up, the lift on the tail becomes more positive, and vice versa, and the plane is thus restored to normal attitude.

Inasmuch as the slipstream from tractor propellers passes over the horizontal tail surfaces, and has a severe destabilizing effect upon them, longitudinal power-off stability necessarily becomes very great and even excessive, in order to have any stability left in, for example, a full power climb. In order to provide the required power-off stability, therefore, the horizontal tail surfaces must be large, with elevators of corresponding size to provide proper control moments.

It is also necessary to develop a compromise stability that will compensate for shift of the center of gravity along the longitudinal axis of the airplane as the amount or position of the disposable load is changed. The longitudinal shift in center of gravity is often 8% to 12% of the mean aerodynamic chord, due to the fact that fuselage type airplanes must have, to a great extent, longitudinal disposition of the disposable load.

These considerations have made it necessary that conventional airplanes be designed with very large horizontal tail surfaces and/or very long tail lengths, i. e., with very high longitudinal static stability with power off, at least for some possible center of gravity positions.

Stability in yaw is conventionally supplied by the vertical tail surfaces, which also act through the same long lever arm to supply a side force in the proper direction to correct any deviation from straight horizontal flight. The fuselage of a conventional airplane is almost always highly unstable in yaw, i. e., the side force acting on a fuselage due to angle of yaw acts at a point forward of the airplane's center of gravity. Hence the vertical tail surfaces must be large enough to overcome this instability and to produce an overall positive stability in addition. This often calls for very large vertical tail surfaces.

The vertical tail surfaces in multi-engined airplanes are also greatly enlarged by a further consideration. Outboard engines spaced, as they must be, at least by the width of the fuselage plus one propeller diameter, exert powerful yawing moments when unbalanced as to thrust as, for example, in case of failure of one or more engines. Such moments require large rudders for control and large rudders require extensive vertical fins to prevent stalling of the rudder at high deflections.

A further reason for excessive areas in vertical tail surfaces is that substantial portions of the fin and rudder are often blanketed by the wing or horizontal tail surfaces when the airplane is in a stalling attitude or in a spin. In both of these conditions proper effectiveness of the vertical tail surfaces is essential, so that such considerations often govern the design.

The effect of the propeller slipstream on the directional stability of a conventional airplane is also very great. It reduces the stability markedly, at least in some conditions of flight, and therefore the vertical tail surfaces must be enlarged still further. Again this results in very great, often excessive, stability in some conditions of power-off flights.

In the conventional airplane stability about the roll axis is usually accomplished by giving the wing a relatively large positive dihedral angle, that is, canting each half of the wing upward so that if a roll starts, the resulting sideslip will increase the lift on the dropping wing and decrease the lift on the rising one and thus supply a correcting moment. In order to obtain dynamic lateral stability, it is necessary that the amount of dihedral angle be properly correlated with the amount of vertical tail area, with large dihedral angles corresponding to large vertical tail surfaces. By "dynamic lateral stability" we mean stability of the combined lateral and directional motion of an airplane. That the two components of this motion are interrelated and cannot be considered separately was shown in 1920 by Bairstow in "Applied aerodynamics." As a result of the enlarged vertical surfaces mentioned above, the dihedral angle has been more or less standardized in modern low or midwing aircraft at from 4° to 6°.

As a result of the above considerations the modern airplane, particularly of the multi-motored type, is excessively stable about all three axes—at least in certain conditions of flight and loading, this stability in turn requiring large control surfaces and control forces (stick loads) to obtain adequate maneuverability. Moreover, the drag attendant to the use of such enlarged control surfaces is highly detrimental to the performance of the airplane.

Turning our attention now to airplanes of the tailless type, we find that several solutions have been heretofore suggested and, to some extent, used to achieve stability in pitch. The first is the use of so-called "inherently stable" airfoil sections for the wing. The difference between such airfoil sections and those more commonly used is that the conventional wing, while it can be made stable by keeping the center of gravity far enough forward, does not have a positive pitching moment at zero lift and therefore cannot be trimmed in the flying range without the application of some control moment. "Trim" is defined herein as the condition of equilibrium of moments, which must be maintained in all conditions of flight. "Inherently stable" profiles have reflexed or S-shaped camber lines, upwardly convex near the leading edge and upwardly concave near the trailing edge, which, at zero lift, supply moments about the pitch axis of the same general character as those supplied by the conventional separate wing and horizontal tail surface structure. Such wings are, however, both structurally and aerodynamically inferior to generally used airfoils.

Another solution involves the use of conventional airfoil sections, but provides the wing with sweepback and washout, i. e., the two halves of the wing are set at an angle, like a shallow V flown apex forward, and the wing is twisted from root to tip so that the aerodynamic angle of attack is greatest at the root of the wing and least at the tip. This type of wing has in effect a reflexed trailing edge due to the combination of sweepback and washout, and consequently it has a positive or stalling moment at zero lift, and if the center of gravity is located forward of the aerodynamic center, so as to maintain longitudinal static stability, it can be trimmed at a desirable cruising attitude without any control deflection. The amount of washout necessary to accomplish this depends upon the amount of sweepback, the amount of static longitudinal stability provided, and the magnitude of lift coefficient at which trim is desired.

In order to secure a degree of stability comparable to conventional aircraft (as has heretofore been considered necessary in all-wing types), it is necessary to employ such large degrees of sweepback and twist as to seriously reduce the maximum lift coefficient of the wing, and substantially increase its drag. Unless otherwise specified, the term "stability" will hereinafter refer to power-off static stability, since that is most intimately connected with the size and location of the stabilizing and control surfaces. As has already been pointed out, the magnitude of the power-off static stability is dictated by the maintenance of satisfactory minimum stability with power on.

Stability in yaw has been heretofore obtained in all-wing planes by means of vertical fins or end plates on the ends of the wing, particularly if these end plates be "toed-in" slightly. Without the toe-in the stabilizing effect of the end plates is proportional to the amount of sweepback and very small for any normal amount thereof. Ample stability is supplied by toe-in, but this increases drag materially, since the toed-in plates have rearwardly directed components of both lift and drag which may be so great as to make supposed elimination of parasitic drag illusory. If the end plates are placed far back, as by the use of a large sweepback angle, their side-force moment is like that of a conventional tail, and they will cause a corresponding increment of drag.

Stability in roll has been taken care of by dihedral as in conventional airplanes. The use of relatively large wing-tip fins or end plates again results in comparatively large dihedral angles if the proper coordination between lateral and directional stability is to be maintained.

We have shown above that while there are apparent means of fulfilling the commonly assumed requirements of stability for tailless types of aircraft, each involves certain disadvantages which detract from the aerodynamic efficiency of this type of airplane. There are additional factors involved which are somewhat more difficult of solution. One of the advantages claimed for the all-wing type of plane is high cruising speed. It is, however, necessary that planes land and take off as well as fly, and a practical airplane must therefore possess a moderate landing speed. The total lift on an airplane wing is proportional to the product of the lift coefficient and the square of the speed, and the lift coefficient varies approximately as the angle of attack of the wing, measured from the angle of zero lift. To produce high coefficients of lift and thus be capable of landing at limited speed, the plane must therefore be able to fly at high angles of attack. In order to attain this high angle of attack the longitudinal control surfaces (elevators, incorporated in the trailing edge of the wing) must be deflected sufficiently to overcome the inherent longitudinal stability of the airplane. If this stability is as great as has heretofore been necessitated by the range of center of gravity position and slipstream effect above noted, the control deflecton will then be so great as to seriously diminish the total maximum lift coefficient. In some cases this effect may be so severe as to reduce the maximum lift coefficient to less than half that obtained in a conventional aircraft. If this be the case, in order to achieve an equivalent landing speed, the area of the wing must be more than doubled. This means that approximately double the drag of the more highly loaded wing will be experienced, and thus we reach the conclusion that we must throw away most of the gain which has been obtained by the all-wing type of structure, and this has proved to be substantially the case in the all-wing structures heretofore built by others.

Furthermore, in accordance with current theories, the various expedients which have been discussed for providing stability about the various axes have been proven wholly or partially incompatible, so that it has been impossible to combine them in a satisfactory airplane. As illustrative of this, in order to be reasonably efficient a wing must have a relatively high aspect ratio, that is, the ratio of its span to its mean chord should be greater than four or five. In order to provide a habitable wing, however, the chord at the wing root should be large, and therefore, if the aspect ratio is to be favorable, the wing must either be highly tapered or the span and area must be excessive. The most recent general survey of all-wing theory (Wuester; Jahrbuch der deutschen Luftfahrtforschung, 1937) concludes that the degree of taper of the wing fixes the extent to which sweepback and washout can be used, and further states that while any practical plane having a substantially rectangular wing need rely on the use of "inherently stable" profiles for only approximately one-half of its positive moment at zero lift, the use of trapezoidal planform (i. e., taper ratios of the order of 1:3) requires that 70% of this moment be inherent in the section, and that with triangular planforms the sections used must be 100% "inherently stable." The center of lift of the most advantageous profiles is approximately one-quarter chord distance back from the leading edge of the wing, and a triangular wing flown apex forward therefore has considerable inherent sweepback. It is seen, therefore, that this theory indicates that the combination of twist and sweepback to produce positive moment at zero lift is ineffective with highly tapered wings.

Since "inherently stable" sections have poor lift-drag ratios, this would indicate that in an all-wing plane an attempt to improve these ratios would be futile, since relatively high drag would be introduced either through a low aspect ratio, giving a high induced drag; or, if the aspect ratio were improved by taper, that a profile having inherently high drag would have to be used. Furthermore, it has been believed formerly that with high tapers the tips of the wing certainly would be subject to tip-stall.

The designer is also confronted by the fact that the most efficient airfoil sections have a thickness of approximately 12% to 18% of the chord length; this thickness ratio may be carried up to approximately 25% without reducing the aerodynamic efficiency unduly (at least if the velocity of flight is less than 60% of the velocity of sound) but it cannot be carried much above this point because of the difficulty of maintaining the airflow over the upper surface of the wing at the higher angles of attack, causing a tendency to stall. This again dictates wings having long root chords, not only to produce a reasonably great floor area in the habitable portion of the wing, but also in order to produce sufficient head room within this area.

It thus becomes apparent why the "Flying Wing" has not heretofore become commercially useful in spite of its apparent attractive features. Other investigators have produced tailless aircraft which have flown with varying success, but none of these airplanes has come into practical use because of the failure of the designers to find a satisfactory solution to the maze of design difficulties described herein which are attendant to the production of an economically practical airplane. Previous tailless airplanes have been characterized by very low wing loadings, the presence of drag-producing structures, such as fuselages, nacelles, vertical stabilizing and controlling surfaces, and by flying characteristics unsatisfactory from one or more standpoints. It may be concluded, therefore, that the various incompatibilities mentioned have been too deep-seated for compromise.

The present invention is concerned with a reconciliation of the above-mentioned incompatibilities, actual or supposed, and particularly with a solution to the problem of high landing speed, leading to a type of airplane which is not merely comparable with airplanes of currently accepted conventional types from the points of view of the ratios of speed to power, payload to power, and load-carrying capacity to initial and maintenance costs, but actually greatly excels in these features and, at the same time, has a reasonable landing speed, greatly simplified structure, and is satisfactory from the general operating point of view.

Reverting to prior efforts to produce practical tailless or all-wing airplanes, the single greatest unsolved problem has doubtless been the serious loss of lift suffered by the wing when its trailing-edge elevators are raised to secure a high angle of attack and a maximum lift coefficient for landing. Unfortunately, the very operation of raising the trailing-edge elevators in an effort to secure a high angle of attack for landing results in reflexing the wing camber in a manner causing the wing to lose a serious proportion of its otherwise available total maximum lift. Unless the wing area is increased to an impractical degree (the only previously recognized remedy), this seemingly inevitable loss of lift has required tailless airplanes to have excessive landing speeds, and inordinate landing field lengths. In result, no tailless or all-wing airplane of desirably low landing speed has to our knowledge been produced prior to the present invention.

Our present solution involves the novel approach of reducing the longitudinal static stability to an unconventionally low order of magnitude, which may be distinguished as being substantially not over from one-tenth to one-fifth of that which designers have heretofore considered to be an acceptable minimum. It is, of course, well understood by aerodynamicists that the longitudinal static stability of a tailless airplane depends solely upon location and maintenance of the center of gravity of the airplane forwardly of the effective aerodynamic center of its wing, and it is further understood that to permit a tailless airplane to be trimmed with elevators neutral, it is necessary to provide a positive or stalling moment coefficient at zero lift, such for instance as by use of inherently stable airfoils, or use of a combination of sweepback with aerodynamic twist or washout. The tailless airplane of the present invention incorporates these basic design features, employing preferably a low degree of sweepback and washout.

It has not heretofore been appreciated, however, that the serious loss of lift in tailless airplanes occasioned by trailing-edge elevator deflection to secure a high angle of attack in landing may be made quite negligible merely by reducing the longitudinal static stability of the airplane to an unconventionally low order of magnitude—so low as to require special safeguards to be taken to preserve it at a positive value. The provision of such safeguards constitutes one feature of the invention, as will presently appear. While a more complete explanation will be given hereinafter, it may here be stated that the use of a longitudinal stability not over from one-tenth to one-fifth conventional values reduces the loss of lift resulting from upward elevator deflection in landing to a negligible consideration; landing speed is thus materially reduced, as is minimum landing field length, all without the prior necessity of material reduction in wing loading (increase in wing area). There is no analogous problem in conventional airplanes with tails, since the elevator deflection, while reducing tail lift (which constitutes a small proportion of the lift of the whole airplane) has no effect at all on the lift of the main wing. With tailless airplanes, on the other hand, the elevators consist of sections in the trailing edge of the wing, and when deflected upwardly, affect the overall lift of the airplane as a whole in a serious manner. Reduction of longitudinal stability in a conventional airplane thus would not solve a problem of loss of lift with upward elevator deflection, since no such problem exists. Reduction of longitudinal stability in tailless airplanes, however, provides a unique solution to a problem which is unique in the tailless type of airplane.

Strict measures must be taken to preserve the critically low longitudinal static stability provided, and in accordance with the preferred practice of the invention, consist of two features: first, the use of pusher propelling means, e. g., either pusher propellers, which are stabilizing rather than destabilizing, or a jet propulsion system (which, while if not stabilizing in effect, at least is not destabilizing, and hence may be relied on to preserve the small stability provided); and second, a concise segregation and distribution of the disposable load within the wing in such wise that the center of gravity can under no normal conditions shift longitudinally to an extent such that the small longitudinal static stability will be lost, on the one hand, or on the other, will be increased to conventional values, with loss of the benefits of the invention.

The problem above stated being thus solved, the many long recognized but illusive advantages of tailless airplanes are fully realized. A secondary advantage flowing from the use of the unconventionally low longitudinal static stability employed consists in an accompanying high degree of controllability with small elevator forces. A still further advantage is a substantial reduction in the required positive moment coefficient at zero lift, meaning less required washout in the wings, and therefore further reduction in drag. No wing-tip fins, either vertical or angular need be utilized for stability in yaw, such stability being mainly dependent on sweepback and therefore being very low. Stability in roll is extremely low, being provided solely by an unusually small dihedral angle, namely, less than 2°.

Broadly, therefore, it will be seen that the airplane of our present invention departs completely from the long held theory that an airplane should be designed to have great static stability, power-off. In the airplane of our present invention, static stability is at all times—power-on and power-off—maintained at a very low positive value around all three axes. The elimination of fins or the equivalent thereof and the reduction in dihedral angle does not, as might first appear, render the airplane of our invention hard to control. On the contrary, a plane designed with such low stability is much more responsive to small control moments than a conventional plane, and therefore is more maneuverable with lower stick forces. Such an airplane will also move through disturbed air with a minimum of divergence from its course.

For the purpose of illustrating our invention, certain present illustrative embodiments thereof are shown in the accompanying drawings, wherein:

Fig. 1 is a top plan view of one embodiment of our invention.

Fig. 2 is a front view of the airplane shown in Fig. 1.

Fig. 4 is a loading diagram showing one preferred loading arrangement in the center section and one wing panel.

Figs. 5, 6, 7, 8 and 9 are diagrams showing chord section contours, taken as indicated by the lines 5—5, 6—6, 7—7, 8—8 and 9—9, respectively, in Fig. 4.

Fig. 10 is a perspective view of the airplane herein described as seen from above and at one side in flight posture.

Figure 11:
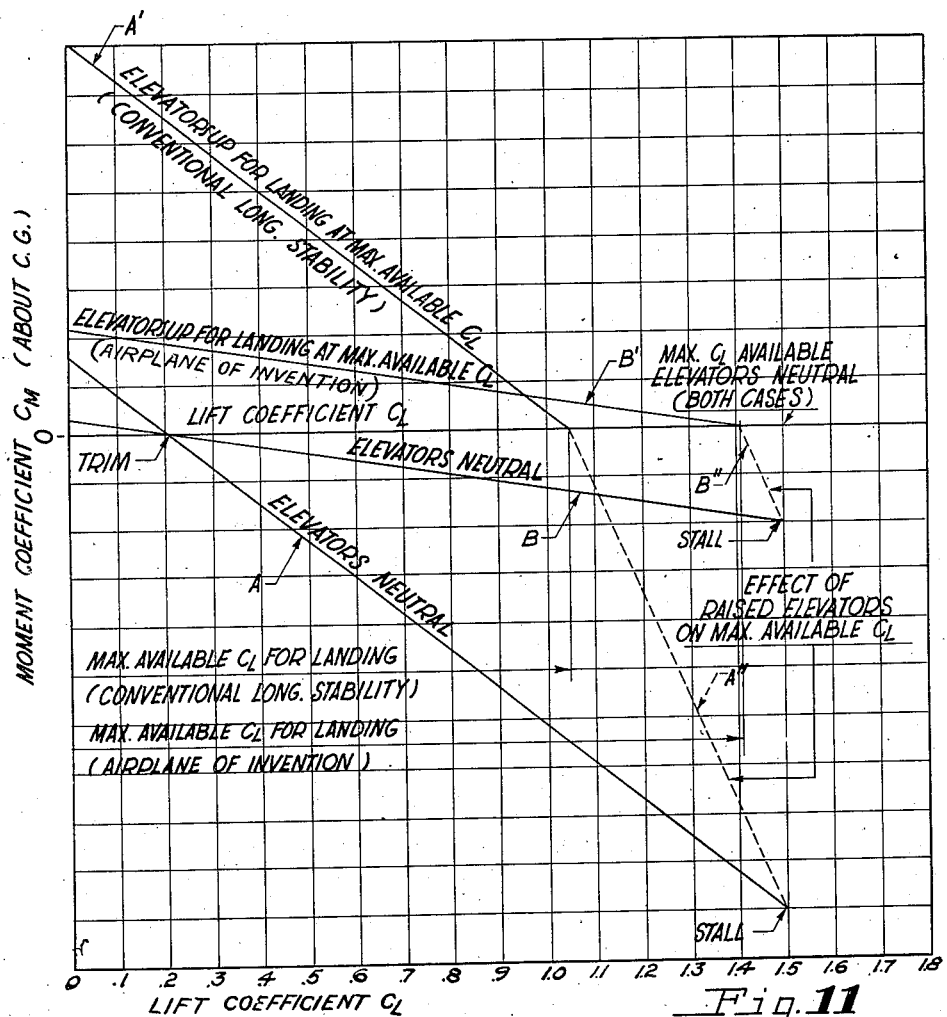

Fig. 11 is a diagram showing the relation between coefficient of lift $C_L$ and moment coefficient $C_M$ about the center of gravity.

Figure 12:
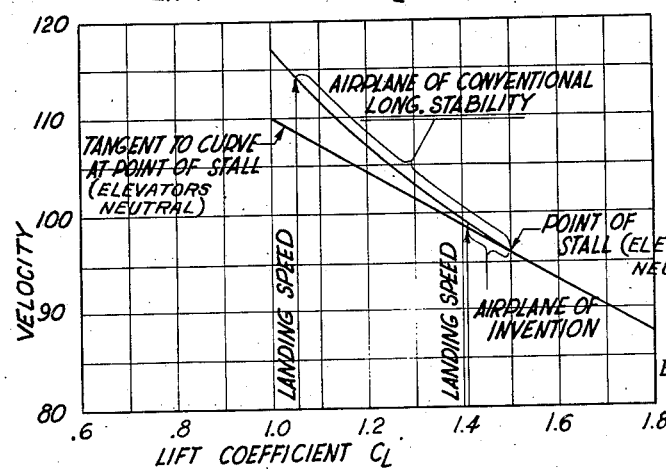

Fig. 12 is a plot of lift coefficient $C_L$ vs. velocity.

Fig. 13 is a plan view of an airplane in accordance with the invention in which a jet propulsion system is employed.

Fig. 14 is a front elevation of the airplane in Fig. 13.

Attention is first directed to Fig. 11, which is a diagram showing the relation between the coefficient of lift $C_L$ and the moment coefficient $C_M$ about the center of gravity for two tailless airplanes, one of a conventional order of longitudinal static stability, and one of longitudinal static stability of the extreme low order characteristic of the invention. The solid curve A represents an airplane of a conventional degree of longitudinal static stability with elevators neutral, and the solid curve B represents the airplane of the present invention (having not over substantially one-fifth the longitudinal static stability of case A), also with elevators neutral. As will be observed, both curves have a negative slope, and both have for convenience in comparison been selected to cross the $C_L$ axis at the same point, which is the point of "trim" with elevators neutral. Obviously, a plane flying in equilibrium, at the "trim" point of the diagram, will experience a diving moment with any increase in angle of attack, or in $C_L$, which amounts to the same thing, and a stalling moment with a decrease in angle of attack, or in $C_L$. Hence any airplane represented by such a curve (A or B) of negative slope is longitudinally statically stable. Further, the slopes $$-\frac{dC_M}{dC_L}$$

of the curves A and B are quantitative measures of longitudinal static stability. Well known analysis reveals that a tailless plane will have longitudinal static stability only if the center of gravity (c. g.) of the plane is forward of the effective aerodynamic center (a. c.) of the wing, which is defined as the point about which the moment coefficient for varying angles of attack is constant; also, that the greater the distance between c. g. and a. c., the greater will be the longitudinal static stability. In order to achieve "trim," it is necessary that the curve of $C_L$ vs. $C_M$ cross the $C_L$ axis, and this may be accomplished in either of two known ways, namely, use of a reflexed airfoil, or of a combination of sweepback with washout. Either expedient provides a positive moment coefficient $C_M$ at zero lift, i. e., $C_L=0$, and hence permits the airplane to fly at equilibrium, or in "trim," with elevators neutral.

Prior authority has given $$-\frac{dC_M}{dC_L}$$

equal to from .10 to .15 as an accepted range for longitudinal static stability, power-off, with the center of gravity in the rearmost position. In accordance with the present invention, the longitudinal static stability is defined as coming within a range not over from one-tenth to one-fifth conventional values. The longitudinal static stability range in accordance with the present invention is accordingly substantially from .01 to .03, or thereabouts. Curve A has been drawn to represent a conventional stability of .15, and curve B to represent a stability of one-fifth of that value, or .03, which may be regarded as a figure substantially demarking the high limit of the longitudinal static stability range characteristic of the invention, and is believed to furnish a reasonably fair basis for comparison. The precise figure of .03 of course has no critical significance, but in a general way, may be taken as approximately setting off the low order of longitudinal stability herein specified.

Curves A' and B' in Fig. 11 represent the airplanes of cases A and B with their elevators raised for landing at the maximum available $C_L$, the sloping dotted lines A" and B" being the loci of the points of stall for the two cases throughout ranges of elevator deflections from neutral to the upward deflections required for landing at maximum $C_L$. The vertical projections of these sloping lines on the $C_L$ axis represent the losses of lift for the two cases as the elevators are raised for landing. As will be clear from the diagram, the loss of lift for the assumed low stability airplane of the invention is just one-fifth of what it is with the assumed airplane of conventional stability. And whereas with the airplane of conventional stability the loss of lift suffered in landing is so serious as to have unquestionably been one of the important factors blocking progress in the field of tailless or all-wing airplanes, with the plane of low stability in accordance with the invention, the loss of lift suffered in landing, thus divided by a factor of at least five, has been made negligible.

The diagram of Fig. 11 further illustrates the fact that the necessary positive moment coefficients at zero lift are much reduced in the case of the low stability airplane, and hence do not require the same degree of washout in the wings to accomplish them. And the moment coefficients being thus substantially lowered, the control or "stick" forces as well as the necessary areas of the pitch control surfaces are commensurately reduced.

Fig. 12, being a plot of lift coefficient $C_L$ vs. velocity, for a typical wing loading of 35 lbs./sq. foot, illustrates the low landing speed of the airplane of the present invention as compared with the airplane of conventional longitudinal stability. The plane of the present invention, assumed to have a longitudinal stability of .03, suffers a loss in maximum available $C_L$ of from 1.5 to 1.41 as the elevators are deflected in landing, and according to the curve, this corresponds to an increase in velocity of approximately three and one-half miles per hour. The curve shows that landing speed, at $C_L=1.41$, is about 99 and a small fraction miles per hour. For the airplane of conventional longitudinal stability, assumed to be .15, the loss in maximum available $C_L$ is from 1.5 to 1.05 as the elevators are deflected for landing, and according to the curve, this means a speed increase of approximately 18 miles per hour, the landing speed being nearly 114 miles per hour. The three miles per hour increase in the case of the low stability tailless airplane of the present invention is of no particular consequence, but a landing speed increase of the order of eighteen miles per hour, owing merely to elevator deflection, is obviously unsatisfactory.

For any given wing loading, velocity varies as the square root of $C_L$, and the plot of $C_L$ vs. velocity is accordingly a curve rather than a straight line, its form being such that as $C_L$ decreases, velocity increases in more than a first degree relation. Within the region of decreasing $C_L$ values experienced in deflecting the elevators to land the low-stability plane of the invention, this curvature does not add materially to the landing velocity; but for the five-fold magnified range of $C_L$ values involved with the assumed plane of conventional stability, the form of the curve alone accounts for an increase of nearly six miles per hour—more in itself than the total increase in velocity for the airplane of the invention. Thus the very form of the curve of velocity vs. $C_L$ operates unfavorably to an appreciable extent toward airplanes of conventional degrees of longitudinal stability, while having an almost negligible adverse effect on airplanes of unconventionally low stabilities in accordance with the invention.

When it is recalled that necessary landing field length varies as the product of the mass of the airplane and the square of landing speed, it becomes evident that the substantial reduction in landing speed effected by the present invention brings about a substantial reduction in required landing field length.

The specific airplane illustrative of the invention and shown in the drawings will next be described. This illustrative airplane is a military bomber having a 4,000 square foot wing area, a wing span of 172 feet, a gross weight of 140,000 pounds, and capable of carrying a useful load of approximately 72,000 pounds, with a wing loading of 35 pounds per square foot.

The airplane has a substantially triangular planform with an angular nose 1 and sweptback wing panels 2, of basic wing profiles which are preferably designed to have substantially zero center-of-pressure movement through all normal flight angles of incidence. This is illustratively and preferably, though not necessarily, accomplished by use of substantially symmetrical wing profiles from root to tip, giving substantially constant center-of-pressure positions one-fourth of the chord length back from the leading edge.

Each wing panel is shown as carrying an elevon 3, a pitch-control flap 4 positioned along the trailing edge, and rudders 5 on the upper and lower surfaces of the aft 40% of the wing panel near the tip. Each wing panel also carries propeller shaft housings, an outboard housing 6 and an inboard housing 7, terminating in geared dual rotation pusher propellers 9 and 11, respectively, the engines being placed wholly within the wing section as will be described later.

Each wing panel may also carry for military purposes, an upper gun turret 12, and a lower gun turret 13. The wing also is provided with a retractable nose wheel 14 and with dual main wheels 15 retractable into the wing section, wheels 14 and 15 forming, when extended, a "tricycle" landing gear. The wheels are extensible to permit ground clearance of a 15-foot diameter propeller. Each wing panel is shown as provided with racks for containing external bombs 16. The leading edge of each wing is shown as provided with inboard and outboard motor-cooling air inlets 17 and 19, respectively.

In the center section of the airplane, positioned about the root chord, is provided a main cabin 21 which may conveniently terminate rearwardly in rear cannon turret 22. The cabin 21 is shown as provided with upper observation window 24. In the center section adjacent the leading edge may be a pilot enclosure 25 and a co-pilot enclosure 26, one on each side of the center line, as well as control windows 27, useful for navigation as will be described later in conjunction with the loading diagram shown in Fig. 4. Upper and lower gun turrets 30 and 31 may also be positioned ahead of cabin 21.

The sweepback measured along the 25% chord line is in the range of from substantially 20° to 25°, though preferably and as here shown it is substantially 22°. The dihedral angle, also measured along the 25% chord line, is positive and is substantially 2° or less, while the wing panels are provided with aerodynamic washout of preferably not over substantially 4°. The preferred embodiment thus has a low dihedral angle, low washout angle, and a moderate sweepback angle. The taper ratio in planform (ratio of root chord to tip chord) may be in the range from 3:1 to 6:1, being preferably and as here shown about 4:1. The aspect ratio is reasonably high, between substantially 5:1 to 10:1, and in the illustrative embodiment here shown, is 7.4:1. The wing panels are tapered in both planform and thickness, the thickness of the root chord section (in percentage of chord), taken in the plane of symmetry where the two wing panels join, being in the approximate range of 16% to 25%, and in the illustrative embodiment being 19%, which approximates the ideal for an airplane of the scale here instanced. For a root chord section of 19% thickness, the tip chord section is preferably of substantially 15% thickness. The taper ratio in thickness thus exceeds the taper ratio in planform.

No wing-tip stabilizing fins of any character are used. Yaw control is secured at all attitudes and speeds by retractable rudders 5, which in each wing section are differentially raised and lowered above and below the aft 40% of the outer wing surface contour as may be desired, in order to produce drag and/or side force in the proper direction to cause a yawing moment.

Elevons 3 are so called because they combine the functions of elevator and aileron. Elevons 3 when moved in opposite directions for roll control operate in the manner of any ordinary trailing-edge ailerons to control the airplane in roll, and when moved together in the same direction, operate as elevators. Linkages to accomplish such diversified control are well known in the art, and form no part of the present invention.

By utilizing elevons 3 for the dual function of elevators and ailerons, these surfaces can be made coextensive if desired.

Landing flaps are utilized on the under surface of the wing, and such flaps can be placed along that portion of the span inboard of the elevons. Such flaps when extended for landing will exert a diving moment, which can be amply compensated for by raising pitch-control surfaces 4 to trim the airplane in the proper aerodynamic attitude for landing. The pitch-control surfaces 4 are used with the landing flaps only for landing and takeoff. Being substantially further aft of the center of gravity of the airplane than are the flaps (by reason of their location near the tips of the swept back wings), they may be substantially smaller than the flaps and may still, because of their greater lever arm, produce a stalling moment sufficient to balance the diving moment caused by the extended flaps. And because they are substantially smaller than the flaps, their use in combination with the flaps results in a substantial net increase in lift. The pitch-control elements are preferably extended by the same hydraulic mechanism that depresses the landing flaps and are not operated by the pilot's control wheel.

The wing is structurally designed and loaded to locate the center of gravity of the airplane not over from substantially from .01 to .03 of the mean aerodynamic chord of the wing forwardly of the aerodynamic center of the wing, meaning a designed longitudinal static stability of from .01 to .03. The illustrative airplane being assumed to have a mean aerodynamic chord of 315", the distance between center of gravity and aerodynamic center is then typically from 3" to 10". In order to illustrate the relations involved, we have drawn in Fig. 4 a laterally extending center of gravity line 50, a 25% chord line 51, and have marked the aerodynamic center at a. c.

From the preceding description of the airplane, it will be apparent that it has been designed to embody the principles of low static stability previously referred to. Such a design must be coordinated with proper load disposition within the plane, particularly the disposable load. One preferred loading diagram is shown in Fig. 4, illustrating how we have loaded the airplane in such a manner as to prevent any appreciable shift in the longitudinal position of the center of gravity during the operation of the plane, even when disposable loads from 50,000 to 60,000 pounds are being carried.

Figure 3:
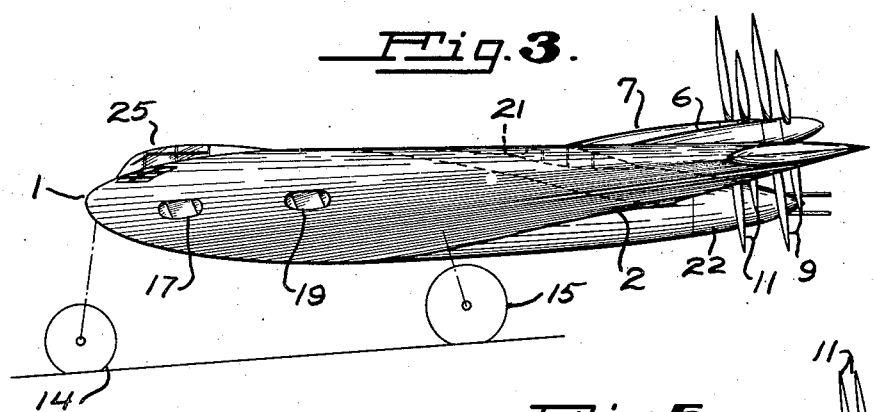
Fig. 3 is a side view of the airplane shown in Figs. 1 and 2, with the landing gear diagrammatically indicated in extended position.
Figure 5:
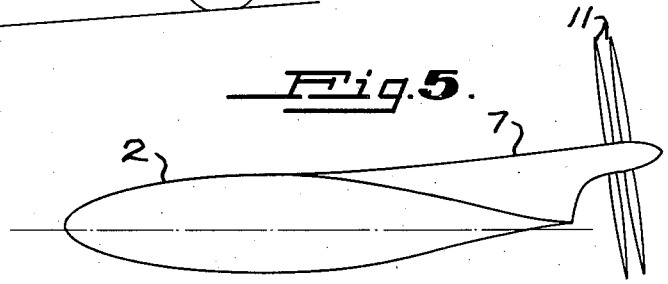
Figure 6:
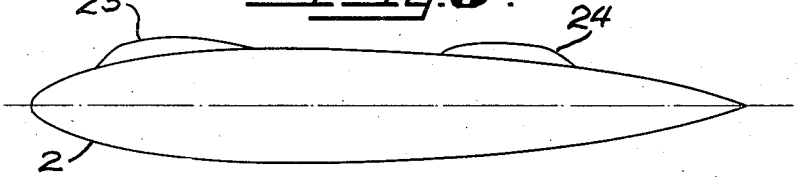
Figure 7:
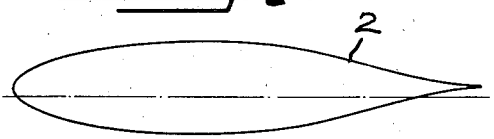
Figure 8:
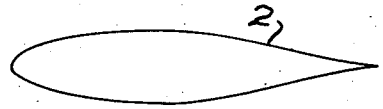
Figure 9:
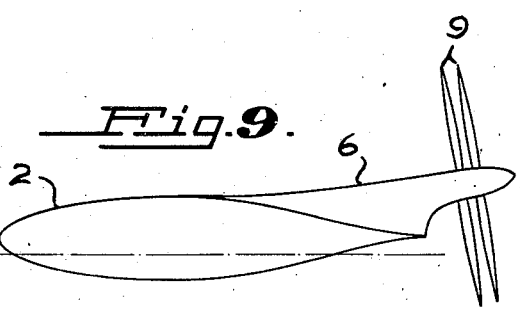

We refer first to the root section as shown in Fig. 6, and adjacent operating bay 52. The root section in the plane being described will have a length of approximately 450 inches, which with 19% thickness will provide approximately an 85 inch headroom, increased slightly by the pilot's enclosure 25 and extending rearwardly by the crew nacelle 24.

Central nose spaces 53 and 54 are preferably occupied by the pilot and co-pilot, flanked by spaces 56 and 57, respectively for the navigator and engineer officers. The radio operator may occupy the space at one side of the central operating bay, leaving the space on the other side available if desired for central, upper and lower gun turrets 30 and 31. At approximately the center of gravity line the crew space 60 is provided, and still further to the rear are gunner control stations 61 and 62 to operate the wing gun turrets 12 and 13 and rear cannon turrets 22 by remote control through any appropriate sighting device.

It will be noted that while the weight of the crew of the airplane is not a disposable load, it is nevertheless well distributed with respect to the crew positions, and to the weight of the rear cannon turret 22 to balance approximately on the center of gravity line 50. Inner engine 63 and outer engine 64 are positioned on opposite sides of the center of gravity line 50 driving propellers 9 through drive shafts 66 and 67, respectively, with the propeller discs of the inboard engines more closely adjacent than would be possible if separated by a conventional fuselage. These engines take cooling air through openings 17 and 19 in the leading edge, and are turbo-supercharged by superchargers 70 as shown attached only to the inboard engine.

Inboard and outboard gas tanks 71 and 72 are provided, spaced on opposite sides of the center of gravity line 50, and oil tanks 74 are provided adjacent to inner gas tank 71, so that the oil may be cooled by oil cooler 75 positioned in the duct 76 to the inboard engine 63. It will be noted that the wing gun turrets 12 and 13 are disposed back of the center of gravity line 50 and that the oil tanks 74 are disposed in front of the center of gravity line 50, whereas the gasoline tanks 71 and 72 are on opposite sides of the center of gravity line. Gasoline consumption therefore can be balanced by taking gasoline from both tanks simultaneously in the proper ratio to prevent longitudinal movement of the center of gravity. Oil will be used up during flight and therefore the oil is positioned to balance loss of weight by expenditure of ammunition from the wing turrets and from the main cannon turret 22. Main landing wheels 15 are retracted to a position almost exactly on the center of gravity line, and the nose wheel when retracted can be balanced by proper positioning of other and minor weights within the wing.

So far we have balanced only the fixed load and the ammunition, gasoline and oil. Such a plane as we have described, however, is adapted to carry extremely large additional useful loads, either in the form of bombs, as in the military embodiment of our invention, or in the form of payload, such as freight, express and passengers in a commercial airplane used for transport purposes. The disposition of the useful load, therefore, is highly important. Inasmuch as the bombs comprise the major load of a military airplane of the type herein being described, it is of great advantage to carry the bombs inside the wing where they will not contribute to drag. Therefore we have provided inner bomb bays 80 and 81 between the inner propeller shaft and the crew nacelle, and outer bomb bays 82 and 84 between inner and outer propeller shafts. Inboard bomb bays 80 and 81 are offset on opposite sides of the center of gravity line 50, with a slight overbalance forward of the center of gravity line. Bomb bays 82 and 84 are divided by the center of gravity line, but are somewhat overbalanced to the rear of the center of gravity line. Such a disposition, however, does not mean that the weight of the bombs in the bomb bays is necessarily unbalanced, because bombs lying longitudinally within the bomb bays will have their centers of gravity forward of their center of length, due to the fins required on the bombs to keep them in straight flight while falling. Consequently, when the bombs are positioned within the bomb bay, their weight can be made to almost exactly balance on each side of the center of gravity line 50, and they can be dropped in proper sequence to prevent any substantial longitudinal shift of the center of gravity of the airplane. The external bombs 16, carried as alternate load in place of fuel for short range missions only are positioned to be exactly balanced along the lateral center of gravity line, and consequently when dropped do not disturb the longitudinal balance of the airplane in any manner.

Of course we do not wish to be limited to the exact loading diagram shown in Fig. 4. This diagram is merely given as being typical and as illustrating the principles involved where disposable load is positioned to be substantially laterally extensive, rather than longitudinally extensive as in conventional airplanes. This description also indicates the proper disposition of fixed load to obtain the proper center of gravity position, with accompanying lateral disposition of substantially all of the disposable load. The disposable load is not necessarily positioned on the lateral center of gravity line, but may be on either side thereof in such a manner that when the disposable load is reduced the center of gravity will not shift along the longitudinal axis of the plane, for example, more than approximately 1% to 3% of the mean aerodynamic chord (depending upon the degree of longitudinal stability selected) as opposed to the usual 8% to 12% in the conventional type of airplane.

So far we have spoken of longitudinal and lateral loading only, with the load disposed to maintain lateral balance and longitudinal balance at all times. The vertical loading is maintained so as to place the center of gravity, with the wheels up, just slightly above the center line of the root chord section. This center of gravity is of course somewhat lowered when the wheels are lowered. The lowering of the wheels will move the center of gravity only slightly downward, and slightly rearward. In no case, however, is the shift of appreciable magnitude.

While we have described in detail above our invention as applied to a rather large airplane, it may be readily determined that habitable space and ample room for power plant and disposable load can be provided in much smaller airplanes. For example, an airplane having an aspect ratio of 5, a taper ratio of 5:1, a root thickness of 25% and a span of 40 feet, would have a root thickness of 3⅓ feet, which is sufficient to provide seating accommodations for the pilot and room for the installation of the required power plants. Such an embodiment of our invention has been built and flown extensively. The airplanes of our invention, regardless of size, incorporate the principles above set forth concerning lateral distribution of load to limit longitudinal shift of center of gravity to the lowest possible values. They likewise are characterized by small twist, low dihedral, and moderate sweepback to the end that the static stabilities about all three axes will be positive but unusually small. These stabilities are obtained without the use of auxiliary stabilizing surfaces.

The restriction of the shifting of the longitudinal center of gravity to a very small per cent of the mean aerodynamic chord under any conditions of loading makes it possible to provide small but positive longitudinal static stability under all loading conditions in spite of the elimination of the fuselage and conventional tail surfaces. This elimination of the fuselage and tail surfaces, together with the elimination of wingtip fins and all but the most minor discontinuities of the lifting wing surfaces, has permitted use to build a flying wing airplane having extremely high efficiency. In order to illustrate this high efficiency we give hereunder the approximate numerical values of three design parameters that are commonly used to compare the relative efficiencies of aircraft. These parameters are, respectively, the ratio of the maximum lift coefficient to the minimum drag coefficient ($C_{L_{max}}/C_{D_{min}}$), the maximum ratio of lift to drag $(L/D)_{max}$, and the ratio of useful load (as defined in N. A. C. A. Report 474, 1939 Nomenclature for Aeronautics) to gross weight. The approximate numerical values of these parameters for the best contemporary comparative planes of conventional design are 120, 20 and 0.50. For the all-wing airplane described in detail hereabove, these values are approximately 175, 25 and 0.60. No satisfactory single comparative parameter has been adopted for the comparison of airplane efficiencies, due to the wide variation of purpose for which aircraft are designed.

We wish in the following paragraphs to review in detail how the airplane of our invention achieves satisfactory stability, control, takeoff and landing characteristics without sacrifice of the long recognized basic advantages of the flying wing.

With regard to longitudinal power-off static stability, this is achieved in a measure ⅕ to 1/10 as great as that formerly considered necessary by location and maintenance of the center of gravity only a very short distance forwardly of the aerodynamic center of the wing, in particular, not over substantially .01 to .03 of the mean aerodynamic chord forwardly of the aerodynamic center (a. c.). This reduced value is satisfactory because of the fact that the airplane of our invention is so loaded as to maintain the fore and aft shift of the center of gravity to less than from 1% to 3% of the mean aerodynamic chord, and because the effect on the stability of the airplane of the application of power to the pusher propellers is not only very small, but as a matter of fact stabilizing rather than destabilizing. In order to trim at a desirable cruising attitude without control deflection this small degree of stability necessitates only moderate sweepback and small twist. The amount of twist required is not larger than that necessary even in conventional airplanes of high taper ratio to inhibit tip stall. In our airplane proper trim and freedom from tip stall are accomplished by the same device without additional penalty in drag.

The attainment of dynamic longitudinal stability depends primarily on having positive static longitudinal stability and positive damping of the pitching motions of the airplane. In our airplane the latter is assured by the sweepback of the wing, and since the static stability, although it is small, is constant, we have provided an all-wing airplane which has a completely satisfactory longitudinal dynamic stability.

We would also like to point out the effect of low static longitudinal stability in regard to the ease of controlling the airplane and in regard to the use of the elevons when moved in the same sense to act as elevators. The control moment required to produce a given change in angle of attack of an airplane is approximately proportional to the degree of stability designed into the airplane. As we have greatly reduced this degree of stability as pointed out above, it follows that the controlling moments can likewise be reduced to similar measure and we are therefore able to control the airplane of our invention by elevons having reduced size and deflection, and therefore requiring reduced forces (stick loads) for their operation. This reduction in control deflection and areas also results in higher available lift coefficients in landing, as previously explained.

The landing and takeoff flaps are also effective in producing additional lift, particularly as we utilize the pitch-control surfaces to produce a large stalling moment which counteracts the diving moment of the flaps without seriously affecting the lift. The rudder surfaces and the elevons are not affected by the use of the high lift devices.

Weathercock stability, or static directional stability, is usually assumed to be of extreme importance, and in an ordinary plane is primarily determined by the product of the vertical tail surface area and the tail length.

In the present airplane this stability is made to be close to zero; much closer to zero, in fact, than that considered acceptable in ordinary airplanes. In view of the fact that no wing fins are necessarily utilized on the airplane of our invention, the only important contribution to directional stability (power-off) is the sweepback, the pusher propellers, of course, contributing to directional stability under power-on conditions. In fact, since the directional stability of our airplane is produced almost entirely by the wing itself, instead of by auxiliary vertical surfaces, the projected sideview area of the wing constitutes the greater part, i. e., approximately 60% or more, of the projected sideview area of the entire airplane. In power-off conditions, the directional stability of the airplane of our invention is made to be approximately one-tenth to one-fifth of the directional stability of the conventional fuselage type plane. This can be done because the destabilizing effects of power in a conventional airplane are not encountered in our airplane, and because the stability of conventional airplanes is often increased unnecessarily by the requirements of large rudders as has been explained above.

It should be pointed out that because of the low value of weathercock stability, the tendency for the airplane to be forced from its normal direction by atmospheric turbulence or gusts is greatly reduced. The above-mentioned elimination of nonessential area in the projected sideview results in a corresponding elimination of disturbing effects due to side gusts and atmospheric turbulence. Likewise, small rudder effects are the equivalent of much larger forces on a conventional configuration, in controlling the airplane directionally.

As the engines can be placed much closer to the longitudinal axis of our all-wing airplane because of the elimination of the fuselage, yawing moments due to unbalanced engine thrust are greatly reduced, and when they do occur can be compensated for by use of the rudders. It should be noted that the type of rudder used to supply a yawing moment does not require any increase in directional stability. This is in contrast to the case of the conventional airplane, where any enlargement of the rudder must be accompanied by a corresponding enlargement of the fin, as has been discussed previously.

Control in roll is produced, as in the conventional airplane, by the use of the elevons, moved in opposite sense. Inasmuch as the dihedral angle is very small, control moments can be correspondingly lower.

As has been mentioned previously, the maintenance of dynamic lateral stability in any airplane depends primarily upon the proper relationship between the lateral and directional static stabilities of the airplane. The dynamic lateral stability of the airplane of our invention is assured by the proper choice of the small dihedral angle to be compatible with the low degree of directional stability employed.

As far as spinning is concerned, the airplane of our invention spins very much like a conventional airplane, since a spin is produced almost entirely by forces acting on the wing itself. The wing panel on the inside of the spin is stalled and the other unstalled. This produces the phenomenon known as autorotation, in which the airplane is in dynamic equilibrium and cannot be brought out of the spin except by the application of a powerful yawing moment. Hence, to bring a conventional airplane out of a spin, the vertical fin and rudder are required to be effective during the spin. Most airplanes that do not recover from a spin suffer from blanketing of the vertical tail surfaces by the horizontal tail surfaces and/or by the fuselage. In our airplane, however, the wing-tip rudder is very effective in stopping a spin, since it operates on the unstalled tip, has a large lever arm from the center of gravity, and will not be blanketed. In consequence, our airplane will recover quickly from a spin.

It will thus be seen that by eliminating the fuselage and tail surfaces or the equivalent thereof, we have eliminated their drag, and have greatly increased the structural efficiency and simplicity of the airplane. Furthermore, we have made an all-wing airplane having a wing loading comparable to that of a conventional airplane and operable at high angles of attack. At the same time, however, we have deliberately designed our airplane to have only a slightly positive longitudinal static stability, with maintenance of this stability by use of pusher propelling means and a novel balancing disposition of the disposable load. This, as previously discussed in detail, leads to a substantial decrease in landing speed without sacrifice of high wing loading, thereby eliminating the last major deterrent to progress with tailless planes. It also leads to reduction in control surface areas and control forces. In addition, we have provided a very low lateral and directional static stabilities so that the airplane can be easily controlled with small corrective forces.

The complete elimination of all separate airfoil surfaces such as fins, rudders, stabilizers, and elevators as are used in conventional aircraft has a further great advantage not previously commented upon. Difficulties of tail surface vibration or flutter are constantly being encountered, particularly in the design and construction of modern high speed aircraft, due not only to the aerodynamic interference upon the tail of the wing, fuselage, engine nacelle, gun emplacement or other object located on the wing surface ahead of the tail, but likewise to the fact that great structural rigidity is necessary in the support of the tail to the wing structure. Sufficient rigidity is difficult to obtain, even when a large fuselage is available for the purpose, and becomes increasingly difficult when military or other considerations make some other method of supporting the tail mandatory. The improvement possible in structural rigidity, simplicity and integrity where the tail surfaces can be completely eliminated is obvious.

The all-wing airplane of our invention has a further major advantage in that the usable volume of space within the confines of the structure is greatly increased over that available in conventional planes. This is due to two facts: first, the space inside the wing can all be used effectively, and is not interfered with by the presence or intersection of heavy structural members such as are required where, for example, a midwing intersects a fuselage; and, second, a considerable portion of the conventional fuselage cannot be used for disposable load items because of center of gravity travel limitations. A concrete example of this advantage is illustrated in the long range bombardment airplane described herein, in which in addition to the crew's quarters and engines, both of which are positioned outside of the wing in conventional airplanes, there is space for nearly double the bomb load which can be carried in a conventional airplane of comparable gross weight. The importance of such additional space to carry larger disposable loads cannot be overemphasized, either from the standpoint of military or commercial use.

It has been stated that a feature of the invention is the use of pusher propelling means in lieu of more conventional tractor propellers, which latter are undesirably destabilizing. Pusher propellers, as mentioned, are somewhat stabilizing in effect, and thus safeguard against loss of the small stability for which the airplane is designed. However, the invention is not limited to pusher propellers, but broadly contemplates any pusher means for applying a forwardly directed thrust through the wing. For example, a jet propulsion power plant is one form of pusher propelling means, is not destabilizing in effect and may be employed to advantage. To illustrate such use, we have in Figs. 13 and 14 shown the airplane of our invention provided with a jet propulsion power plant. The wing of Figs. 13 and 14 may be the same as that of the earlier detailed embodiment, and corresponding parts and features are identified by similar reference numerals. Also, the loading principles and low order stabilities explained in connection with the first embodiment will be understood to be applicable to and incorporated in the airplane of Figs. 13 and 14, and hence need not again be described.

With reference now to Figs. 13 and 14, the wing houses two sets or banks 100 of jet generators 101, one bank on either side of the longitudinal center line of the airplane, and each bank is here shown as comprising three generators 101, vertically staggered for compactness. These generators are mounted in a thrust-reaction mounting framing, diagrammatically indicated at 102, which framing is in turn rigidly mounted to the interior structure of the wing in any suitable fashion. Intake orifices 103 for the two banks of generators are formed in the leading edge of the wing, and communicate via branching ducts 104 with the generators. The generators discharge through the trailing edge of the wing via nozzles 105. The generators per se form no part of the present invention, and no detailed description thereof is deemed necessary herein. It will be evident that the airplane of Figs. 13 and 14 still further reduces vertical fin area, the fins supporting the propeller shaft housings of the first embodiment being avoided. The airplane in this form accordingly almost eliminates areas not forming a part of the wing itself.

We claim:

1. A tailless airplane comprising a wing having a tapered and swept back planform, and pusher propelling means disposed rearward of the trailing edge of said wing, said airplane having its center of gravity located within substantially 3% of the mean aerodynamic chord of the wing from the areodynamic center of the wing.

2. An airplane in accordance with claim 1, in which the wing panels have an aerodynamic washout of not more than substantially 4° at the tips.

3. An airplane in accordance with claim 1, in which the wing panels have an aerodynamic washout of not more than substantially 4° at the tips, and a positive dihedral angle of not more than substantially 2° along the 25% chord line.

4. An airplane in accordance with claim 1, in which the wing has an aspect ratio of between 5 and 10, an aerodynamic washout of not more than substantially 4° at the tips, and a positive dihedral angle of not more than substantially 2° along the 25% chord line.

5. An airplane in accordance with claim 1, in which the wing has an aspect ratio of between 5 and 10, a sweepback angle measured along the 25% chord line of between the substantial limits of 20° and 25°, an aerodynamic washout of not more than substantially 4° at the tips, and a positive dihedral angle of not more than substantially 2° along the 25% chord line.

6. An airplane in accordance with claim 1, in which the wing has an aspect ratio of between 5 and 10, a sweepback angle measured along the 25% chord line of the order of 22°, an aerodynamic washout of not more than substantially 4° at the tips, and a positive dihedral angle of not more than substantially 2° along the 25% chord line.

7. An airplane in accordance with claim 1, in which the wing has an aspect ratio of between 5 and 10, a sweepback angle measured along the 25% chord line between the substantial limits of 20° and 25°, a taper ratio of root chord to tip chord of between 3:1 and 6:1, an aerodynamic washout of not more than substantially 4° at the tips, and a positive dihedral angle of not more than substantially 2° along the 25% chord line.

8. An airplane in accordance with claim 1, in which the wing has an aspect ratio of between 5 and 10, a sweepback angle measured along the 25% chord line between the substantial limits of 20° and 25°, a taper ratio of root chord to tip chord of the order of 4:1, an aerodynamic washout of not more than substantially 4° at the tips, and a positive dihedral angle of not more than substantially 2° along the 25% chord line.

9. An airplane in accordance with claim 1, in which the wing has an aspect ratio of between 5 and 10, a sweepback angle measured along the 25% chord line of between the substantial limits of 20° and 25°, an aerodynamic washout of not more than substantially 4° at the tips, and a positive dihedral angle of not more than substantially 2° along the 25% chord line, and in which the projected area of the wing in side view is at least 60% of the projected side view area of the entire airplane.

10. An airplane in accordance with claim 1, in which the wing is tapered in both planform and thickness and has at the root chord a thickness of from substantially 15% to 25% of the root chord, and in which the wing contains means for supporting load disposable in flight, with said load assorted into portions disposable substantially at the same rate and located in substantially balanced relationship fore and aft of the center of gravity of the airplane.

11. An airplane in accordance with claim 1, in which the wing is tapered in both planform and thickness and has at the root chord a thickness of from substantially 15% to 25% of the root chord, and in which the wing contains means for supporting load and restricting fore and aft shift of load in flight in such a manner as to confine longitudinal shift of the center of gravity of the loaded airplane to less than the distance between the designed center of gravity of the loaded airplane and the aerodynamic center of the wing.

12. A tailless airplane comprising a wing having a tapered and swept back planform, elevators at the trailing edge of said wing, and pusher propelling means disposed rearward of the trailing edge of said wing, said airplane having its center of gravity located within substantially 3% of the mean aerodynamic chord of the wing from the aerodynamic center of the wing.

13. In an all-wing airplane, the combination of: a habitable wing adapted to confine and carry a load, and pusher means for applying a forwardly directed thrust through said wing, said wing being adapted to carry and maintain said load in positions establishing and confining the center of gravity of the airplane within substantially 3% of the mean aerodynamic chord of the wing from the aerodynamic center of said wing.

14. An airplane as defined in claim 13, in which the wing has a vertical thickness at the root of the order of from 15% to 25% of the root chord length and in which the wing tapers in thickness toward the wing tips to provide relatively large lateral wing space for accommodation of fixed and flight-disposable loads, said flight-disposable loads being arranged in portions located both fore and aft of the lateral center of gravity line, and being arranged for disposal, in both locations, at substantially equal rates.

15. A tailless airplane comprising a wing having a tapered and sweptback planform, trailing edge elevators incorporated in said wing, and pusher means for applying a forwardly directed thrust through said wing near the level of the center of gravity of the airplane, said airplane having its center of gravity located within substantially 3% of the mean aerodynamic chord of the wing from the aerodynamic center of the wing.

16. A tailless airplane comprising a wing having a tapered and sweptback planform, the halves of said wing having an aerodynamic washout of not exceeding 4° at the tips, trailing edge elevators incorporated in said wing, and pusher means for applying a forwardly directed thrust through said wing near the level of the center of gravity of the airplane, said airplane having its center of gravity located within substantially 3% of the mean aerodynamic chord of the wing from the aerodynamic center of the wing.

17. A tailless airplane comprising a wing having a tapered and sweptback planform, the halves of said wing having an aerodynamic washout of not exceeding 4° at the tips, and being set at a dihedral angle of not exceeding 2° along the 25% chord line, trailing edge elevators incorporated in said wing, and pusher means for applying a forwardly directed thrust through said wing near the level of the center of gravity of the airplane, said airplane having its center of gravity located within substantially 3% of the mean aerodynamic chord of the wing from the aerodynamic center of the wing.

18. In an all-wing airplane having trailing edge elevators and having an aerodynamic center and a center of gravity, and in which said trailing edge elevators can be sufficiently upwardly deflected to cause stalling of the airplane by increase of the angle of attack, with accompanying decrease of lift coefficient at the stall: means for minimizing the maximum necessary upward deflection of said elevators requisite for vertical maneuvering and thereby inhibiting stalling of said airplane; comprising, fixed and variable loads mainly laterally arranged in said wing and disposed therein in such close fore and aft proximity to the aerodynamic center of the wing as to thereby locate the center of gravity of the airplane in a critically close coupled relationship to the aerodynamic center of the wing, combined with forwardly-acting rearwardly located thrust means, to thereby confer and preserve a critically low longitudinal static stability upon the airplane and render small elevator deflections sufficient to effectuate large changes in the angle of attack of the airplane, whereby the available lift coefficient is materially augmented.

19. In an all-wing airplane having trailing edge elevators and having an aerodynamic center and a center of gravity, and in which said trailing edge elevators can be sufficiently upwardly deflected in landing to cause stalling of the airplane, by increase of the angle of attack with accompanying decrease of lift coefficient at the stall: means for minimizing the maximum necessary upward deflection of said elevators requisite for landing and thereby inhibiting stalling on landing; comprising, fixed and variable loads mainly laterally arranged in said wing and disposed therein in such close fore and aft proximity to the aerodynamic center of the wing as to thereby locate the center of gravity of the airplane in a critically close coupled relationship to the aerodynamic center of the wing, both the fixed load and the variable load being vertically disposed in the wing in such manner as to fix and maintain the center of gravity of the airplane, in the vertical plane, closely adjacent to the chord-line of the root section of the wing, combined with forwardly-acting rearwardly located thrust means; to thereby confer and preserve a critically low longitudinal static stability upon the airplane and render small elevator deflections sufficient to effectuate large changes in the angle of attack of the airplane, whereby the available lift coefficient is augmented.

20. A tailless airplane of low but positive static stability about all axes in which principal directional stability is derived from sweepback, embodying the combination of: a habitable wing of relatively thick root chord section, said wing tapering in planform and tapering in thickness progressively and uniformly from a thick root section to relatively thinner tips and from which any substantial vertical fin area is excluded, and having a sweepback angle along the 25% chord line of between substantially 20° and 25°, and a positive dihedral angle of not over substantially 2° from root to tip, the projected side view area of said wing being at least 60% of the projected side view area of the entire airplane, all to the end of minimization of vertical fin area, whereby the directional stability of the airplane is principally derived from the aforesaid sweepback, and vertical plate area subjecting the airplane to side buffeting is minimized; and pusher propellers located aft of the trailing edge of the wing for applying a forwardly directed thrust through said wing, said pusher propellers contributing substantially the remainder of the directional stability of the airplane.

21. An all-wing airplane of critically low directional stability embodying a tapered, sweptback wing, of sweepback angle along the 25% chord line of between the substantial limits of 20° and 25°, and pusher propellers located aft of the trailing edge of the wing for applying a forwardly directed thrust through said wing, said sweepback being responsible for the major portion of the directional stability of the airplane, and said pusher propellers contributing substantially the remainder of the directional stability of the airplane.

JOHN K. NORTHROP.
WILLIAM R. SEARS.